UNITED STATES PATENT OFFICE.

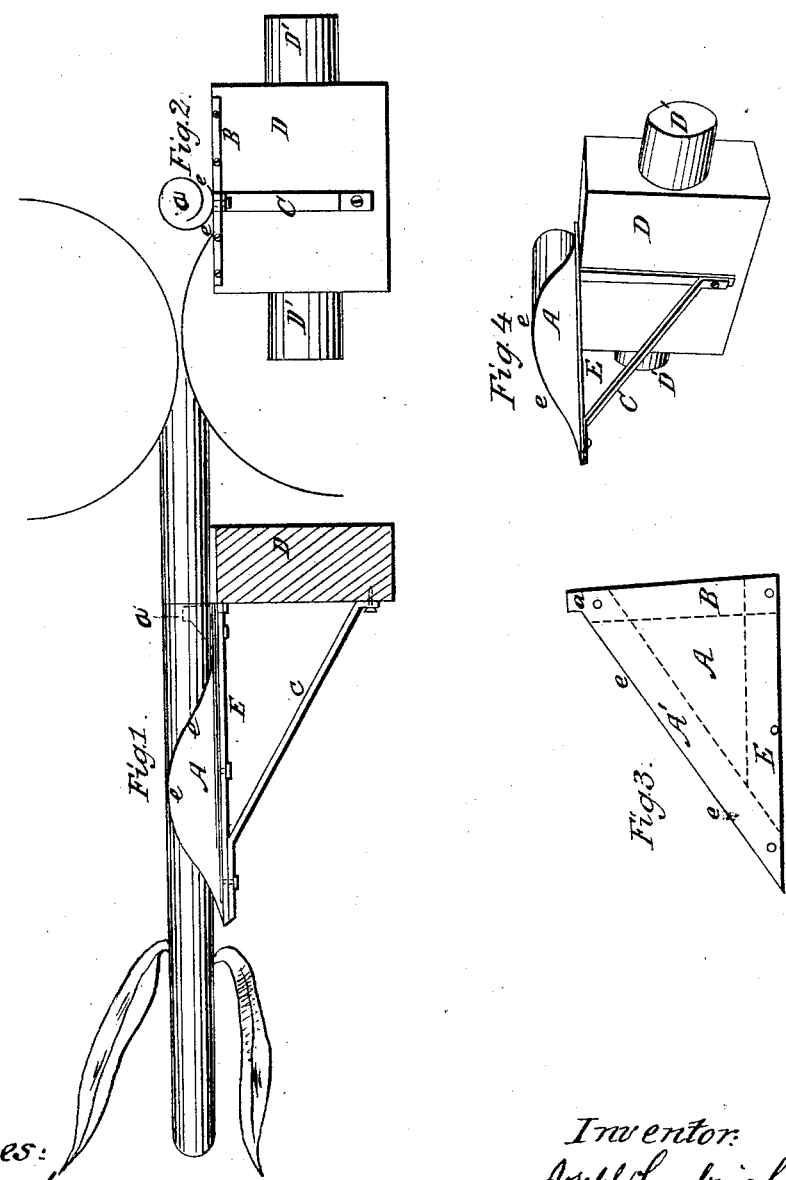

JOSEPH GOODRICH, OF MUSCODA, WISCONSIN.

IMPROVEMENT IN SORGHUM-STRIPPERS.

Specification forming part of Letters Patent No. 37,041, dated December 2, 1862.

*To all whom it may concern:*

Be it known that I, JOSEPH GOODRICH, of Muscoda, in the county of Grant and State of Wisconsin, have invented a new and useful Improvement in Self-Adjusting Sorghum-Strippers; and I do hereby declare that the following is a full, clear, and exact description thereof, reference being had to the annexed drawings and the letters and figures marked thereon, forming a part of this specification, in which drawings—

Figures 1 and 4 represent a side view of my invention; Fig. 2, an end view of the same; and Fig. 3 represents the form of the plate constituting the knife or cutter previous to being coiled into shape, as shown in Figs. 1 and 2.

Similar letters in the different figures denote corresponding parts of my invention.

The object of my invention is to obtain a device to be attached to a sorghum-mill in such a manner and of such a nature that the cane, in being drawn into the mill by the rollers thereof, is first drawn through my self-adjusting stripper, which detaches and removes from the cane the leaves and the tight sheath around the joints of the cane, in which the strong green flavor found in the sirup resides, and also the dirt and filth, thus obviating the labor and expense of stripping the cane by hand in the field, and producing sirup pure and clear and to a great extent free from the green acrid taste which forms a great objection to sorghum sirup.

To enable others skilled in the art to make and use my self-adjusting sorghum-stripper, I will proceed to describe the same with particularity.

My invention consists in a cutter or knife formed of an elastic steel plate of a triangular shape so coiled and constructed as to readily adjust itself to the cane in passing through it. The small end of the cane being introduced, as the cane is gradually drawn through the cutter expands to admit the increasing thickness of the cane, and at the same time its elasticity is sufficient to adjust the cutter closely to the cane, so as to remove and strip off the leaves, dirt, and tight sheath, as aforesaid.

In the annexed drawings, D represents a block to which the stripper is attached, which is fastened to the frame of the mill in any suitable manner and in such a position that the cane in passing through the cutter A will pass directly between the crushing-rollers of the mill. This cutter may be attached rigidly to the mill; but I prefer to attach it so as to have a slight vibratory motion, so as to adapt itself to any crookedness or bends in the cane. In the drawings I design it to be attached or sustained by the lugs or axis D', these being inserted in suitable supports.

E is an iron support for the cutter, and is fastened to D by screws, or in any suitable manner, and is also supported and strengthened by the brace C. The knife A (seen in Fig. 3) having been coiled into the proper shape, as seen in Figs. 1 and 2, is then fastened by means of rivets, or in some other suitable manner, to the bar E, as shown in the drawings.

The entire edge (marked E) is made sharp and cutting, except at *a*, which represents a deflected lip, which does not cut the cane, but allows it to slide through and causes the elastic knife or cutter to expand.

The cutter may be constructed of a single plate of suitable thickness or be composed of three strips, as shown by the dotted lines in Fig. 3, though I prefer the single plate, as being stronger.

The device, when attached to the mill, should be near the rollers, so that when the small end of the cane passes through the cutter the rollers may catch it and draw it through.

I do not confine myself to a single stripper, but as many strippers may be attached as the capacity of the mill admits.

I claim as my invention—

The cutter A, when constructed, arranged, and operating substantially as and for the purposes delineated and set forth.

JOSEPH GOODRICH.

Witnesses:
 W. E. MARRS,
 LEWIS L. COBURN.